United States Patent [19]

Parker

[11] 4,366,173

[45] Dec. 28, 1982

[54] EDIBLE COLORANT

[75] Inventor: Bernard J. Parker, Manly Vale, Australia

[73] Assignee: Mauri Brothers & Thomson (Aust) Pty. Limited, Sidney, Australia

[21] Appl. No.: 233,581

[22] PCT Filed: Jun. 3, 1980

[86] PCT No.: PCT/AU80/00020

§ 371 Date: Feb. 4, 1981

§ 102(e) Date: Jan. 27, 1981

[87] PCT Pub. No.: WO80/02695

PCT Pub. Date: Dec. 11, 1980

[30] Foreign Application Priority Data

Jun. 4, 1979 [AU] Australia ............................ PD9049

[51] Int. Cl.$^3$ ...................... A23L 1/185; A23L 1/272; A23L 1/204; A23L 1/209
[52] U.S. Cl. ........................................ 426/20; 426/21; 426/28; 426/29; 426/44; 426/250; 426/540; 426/436
[58] Field of Search ....................... 426/28, 20, 29, 21, 426/250, 540, 436, 596, 44

[56] References Cited

U.S. PATENT DOCUMENTS

| | | | |
|---|---|---|---|
| 1,069,267 | 8/1913 | Kellogg | 426/29 |
| 1,189,125 | 6/1916 | Kellogg | 426/44 |
| 1,544,649 | 7/1925 | Kellogg | 426/29 |
| 3,353,960 | 11/1967 | Bavisotto | 426/29 |
| 3,594,179 | 7/1971 | Korolev et al. | 426/29 |
| 3,711,292 | 1/1973 | Sfat et al. | 426/29 |
| 3,716,365 | 2/1973 | Walmsley et al. | 426/29 |

OTHER PUBLICATIONS

Hind, Brewing Science and Practice, vol. 1, Brewing Processes, Chapman & Hall Ltd., London, 1950, pp. 271–283.

*Primary Examiner*—Jeanette M. Hunter
*Attorney, Agent, or Firm*—LeBlanc, Nolan, Shur & Nies

[57] ABSTRACT

A food grade colorant which is substantially free of 4 methyl imidazole 4 MeI is obtained by digesting a roasted malted cereal in water by use of at least one protease and at least one carbohydrase enzyme. The aqueous extract is separated from remaining solids and retained for use as the colorant. It may be concentrated or dried to a free flowing powder. The colorant obtained from roasted black malted barley typically has a 4 MeI content of less than 50 mg/Kg and a color greater than 14,000 EBC units at 70% solids.

32 Claims, No Drawings

EDIBLE COLORANT

TECHNICAL FIELD

This invention relates to an edible colourant of use as an additive to foodstuffs, beverages, pharmaceuticals, toiletries and the like, and relates in particular to a colourant which may be used as a substitute for caramel colourants such as are now used in foodstuffs.

BACKGROUND ART

At present caramel colours produced by the ammonia process are widely used in foodstuffs. Caramel colourants have a content of 4 methylimidazole (4 MeI), typically of 200-500 mg/Kg at 20,000 to 50,000 EBC colour units. 4 methylimidazole has been suspected of possessing carcinogenic properties and although that suspicion has not been proved, considerable demand exists for a food grade colourant which is substantially free from 4 MeI. However, no suitable substitute for caramel colourants has hitherto been found.

DISCLOSURE OF THE INVENTION

According to preferred embodiments, products prepared according to the present invention are of a dark brown hue to black in colour and have a colouring power comparable to that of ammonia process caramel without having correspondingly high 4 MeI levels. The products have an iso-electric point in the pH range of from 2.1 to 7.0 and may be used in the presence of charged particles in solution without causing co-precipitation. They are therefore of use in the manufacture of beer, soft drinks and the like. The products can be obtained in liquid form as an acid stable, clear, sediment free, liquid capable of storage at room temperature or in a dried form which may be reconstituted by addition of water to yield a liquid having similar properties.

According to a first aspect the invention consists in a process comprising the steps of:

(A) digesting a roasted malted cereal in water by use of at least one enzyme of a mixture of enzymes at least one enzyme of said mixture being selected from the group comprising proteases and at least one other enzyme selected from the group comprising carbohydrases, and (B) subsequently separating an aqueous extract from remaining solids and retaining said extract whereby there is retained a colourant suitable for use in foodstuffs and beverages.

According to a second aspect the invention consists in a process according to the first aspect wherein said first step includes the steps of:

selecting a malted cereal, and roasting said selected malted cereal, whereby to obtain said roasted malted cereal.

According to a third aspect of the invention consists in a process according to the second aspect further comprising the steps of:

selecting a cereal, and malting said selected cereal whereby to obtain said selected malted cereal.

According to a fourth aspect the invention consists in a colourant for use in foods and beverages comprising the product of enzymic digestion of a roasted malted cereal separated from mash solids and having a content of 4 methylimidazole of less than 100 mg/Kg.

According to preferred embodiments of the invention the cereal selected is barley, malting is controlled to yield black malted barley suitable for roasting to yield a black malted barley and conventional roasting means are then used to produce a roasted black malted barley. The roasted black malted barley so obtained is then digested with the assistance of a mixture of enzymes. A preferred protease is papain and for preference the carbohydrases for use in the process are selected from the group comprising alpha-amylase, beta-glucanase, amylo-glucosidase, and cellulase. More preferably the selection includes at least two carbohydrases. A preferred enzyme active mixture for use in the process comprises the protease papain, together with a mixture of the carbohydrases alpha-amylase and beta-glucanase.

BEST MODE OF CARRYING OUT THE INVENTION

One embodiment of the invention will now be described by way of example. A cereal is first selected. The cereal may be barley, wheat, rye, oats, sorghum, corn, rice or the like but barley is preferred.

The cereal selected is next malted by conventional methods appropriate to the cereal selected. Preferably the malting conditions are controlled to yield a malted cereal suitable for preparation of a "black malt" type. In the case that barley is the selected cereal, there is thus obtained malted barley.

The malted cereal is next roasted by conventional methods to produce a roasted malted cereal, preferably of the "black malt" type.

The remainder of the process will hereinafter be described with particular reference to use of black malted barley as an intermediate, but it will be understood that other black malted cereals, or roasted malted cereals, or mixtures of any of them may be used.

The roasted black malt is charged to a tank and water is added. The quantity of water added is chosen having regard to the amount needed to achieve adequate digestion and control of digestion on the one hand, and to the economic desirability of maintaining the product at a reasonably high concentration on the other.

A mixture of enzymes is then added. The mixture contains at least one protease, and in addition, at least one carbohydrase. A desirable enzyme mixture for use in the process comprises papain, alpha-amylase and beta-glucanase. However, other proteases such as bacterial or fungal proteases and other carbohydrases, for example amylo-glucosidase and/or cellulase may be included or substituted for those mentioned.

The digestion conditions are controlled particularly in regard to pH and temperature to optimize the activity of the enzyme active mixture selected. Preferably these conditions are adjusted in a sequence to optimize the activity firstly of the protease and then of the carbohydrase or of each of them, if more than one. The liquor obtained from digestion is then separated from remaining solids by means, for example, of vibrating screens and then clarified by filtration and/or centrifugation. The clarified product may be used as a colourant or may be evaporated to yield a liquid colour concentrate or, if desired, subsequently dried, for example spray dried, to yield a free flowing powdered product. The mash solids retained by the vibrating screens may be returned to a digestion tank for further digestion in order to improve yields. Using three digestions it is possible to obtain a yield in excess of 50% of product (at 100% solids equivalent) by weight of roasted black barley malt used as a starting material.

By way of further example 100 Kg of roasted black barley malt are loaded to a suitably sized stainless steel tank, 425 litres of water are added with heating to 55° C., and agitation or, if necessary, recirculation by pumping. The pH which is typically at pH 4.7 is then adjusted using a suitable food grade alkali, for example, sodium hydroxide, or if necessary a food grade acid, to a pH of pH 5.2 to pH 5.6 and preferably to pH 5.5.

0.2 Kg of Biase (a mixture of alpha-amylase with beta-glucanase available from BIOCON (Australia) Pty Ltd of 59 Crown Street, Richmond, Vic. 3121 Australia) and 0.15 Kg of Progan (a mixture of papain with beta-glucanase also available from BIOCON LTD) are then added to the contents of the tank and agitation is continued for 30 minutes at 55° C., the temperature then being increased to 62° C. and agitation being continued for a further 150 minutes.

The solids are then separated from the first liquor by pumping the contents of the tank over vibrating screens. For example, a Kason vibroscreen having multiple 24" diameter decks and mesh sizes ranging from 60-200 mesh U.S. Standard Sieve sizes. The first liquor is collected, and preferably is stored under refrigeration if any delay is to occur prior to clarification thereof.

The mash solids from the screens are transferred to a digest tank and 300 liters of water at 72° C. is added with agitation and recirculation as necessary. The pH is again adjusted to pH 5.5 using food grade sodium hydroxide and a mixture of 0.2 Kg of Biase and 0.05 Kg of Progan is added.

The second liquor is recirculated for 60 minutes at 72° C. with agitation and then separated from the mash solids of the second liquor by passage through the vibrating screens. The second liquor may also be stored under refrigeration pending clarification thereof.

The wet mash solids extracted from the second liquor are returned to a tank and aproximately 200 liters of water at 90° C. added. The third liquor is agitated and recirculated as necessary for 60 minutes at 90° C. and the mash solids are then separated from the third liquor in a similar manner as from the first and second liquors. Desirably, the liquors are then heated to above 95° C. and preferably boiled to deactivate any enzyme contained.

The enzyme levels used in the above example are as shown in Table 1. The total enzyme requirement of the example is shown in Table 2. Table 3 shows the basis on which activity is expressed. Enzyme activity levels in excess of 10,000 units (as herein defined) are preferred.

It will be understood that while it is strongly preferred to add the enzymes as a mixture and then to alter the conditions to favour the activity of those selected in a sequence, the digestion could equally be carried out in a sequence of steps using one enzyme at a time.

The first, second and third liquors are next clarified by centrifugation or by suitable filter means to remove fine suspended matter. There is thus yielded a product which (1) exhibits a low viscosity (2) forms a bright solution free from haze when diluted (3) is at a mild pH in either dilute or concentrated solution (4) is enzyme inactive (5) has no tendency to strain and (6) is suitable for use in foodstuffs as a colouring agent.

For preference the clarified extract is evaporated to a total solids of up to 80 or 85% by weight so that the storage stability is ensured and the product remains pourable. Evaporation by means of a falling film or wiped film evaporator is suitable.

The concentrated colourant can also be dried to a free-flowing powder typically from 94 to 99.9% of total solids by weight and of low hygroscopicity by conventional spray drying or other suitable means. The dried product when reconstituted with water forms a bright solution with all the properties of the liquid concentrate.

As shown in Table 4, the final product has a 4 MeI content of less than 50 ppm at 20,000 EBC (European Brewery Convention Colour Scale) units and typically of 10 to 17 ppm and a colour of from 16,000 to 19,000 EBC units at 80% solids by weight.

A yield of 50% on a dry solids basis was obtained using the procedure and quantities of the above example. Yields of approximately 60% have been obtained in larger scale trials.

The colouring power can be controlled within acceptable limits. The product may be used singly or in combination with caramels.

The process gives a high yield without demanding high temperature or energy input. Moreover since mild pH conditions are employed sophisticated handling techniques and materials are not required and effluent disposal poses little problem.

The separation of coarse solids suitable for re-extraction by screening has the advantage that fine solids need not be returned for re-extraction resulting in more efficient subsequent separations.

Use of mild agitation rather than pumping and recirculation has been found to result in a higher yield with a lower proportion of fine suspended solids.

TABLE 1

ENZYME LEVELS

| 1st Extract | | |
|---|---|---|
| 200 g Biase provides | alpha-amylase | $7.47 \times 10^6$ units |
|  | beta-glucanase | $5.60 \times 10^3$ units |
| 150 g Progan provides | papain (protease) | $1.2 \times 10^7$ tyrosine units |
|  | beta-glucanase | $6.25 \times 10^3$ units |
| 2nd Extract | | |
| 200 g Biase provides | alpha-amylase | $7.47 \times 10^6$ units |
|  | beta-glucanase | $5.60 \times 10^3$ units |
| 50 g Progan provides | papain | $4 \times 10^6$ tyrosine units |
|  | beta-glucanase | $2.1 \times 10^3$ units |

TABLE 2

TOTAL DIGEST REQUIREMENTS
(expressed in specific units of activity)

|  | 1st Extract | 2nd Extract | ACTUAL Total Extract |
|---|---|---|---|
| alpha-amylase | $7.47 \times 10^6$ | $7.47 \times 10^6$ | $1.494 \times 10^7$ |
| beta-glucanase | $5.60 \times 10^3$ | $5.60 \times 10^3$ |  |
|  | $6.25 \times 10^3$ | $2.10 \times 10^3$ |  |
| Total beta-glucanase units | $11.85 \times 10^3$ | $7.70 \times 10^3$ | $1.955 \times 10^4$ |
| papain | $1.2 \times 10^7$ | $4.0 \times 10^6$ | $1.6 \times 10^7$ |

Industrial Applicability:

The invention has wide application in industry by providing a food grade colourant which can be used in place of caramel colours now widely used.

TABLE 3

ENZYME ACTIVITIES USED IN TABLE 1 AND TABLE 2

Biase    alpha-amylase from *B. Subtilus* s.g. 1.07 $\frac{grams}{milliliter}$    Activity determined at 40° C. and pH 6.0

TABLE 3-continued
ENZYME ACTIVITIES USED IN TABLE 1 AND TABLE 2

|  |  |
|---|---|
|  | at 40,000 units/milliliter of total enzyme mix. |
|  | at 37,380 units/gram of total enzyme mix. |
|  | beta-glucanase endo/exo beta-glucanase from |
|  | *B. Subtilus* where activity determined on |
|  | Beta Glucan (available from Biocon) |
|  | substrate |
|  | at 50° C. and pH 5.0 expressing Units of |
|  | Activity as milligrams of maltose produced |
|  | per milliliter of enzyme mix. |
|  | At 30 units per milliliter of total enzyme mix. |
|  | At 28 units per gram of total enzyme mix. |
| Progan | Papain - protease from latex of papaya fruit. |
|  | Activity registered as tyrosine units per |
| s.g. 1.20 $\frac{\text{grams}}{\text{milliliter}}$ | milligram of total enzyme mix. |
|  | In Progan at a concentration of 80 tyrosine |
|  | units per milligram of total enzyme mix. |
|  | beta-glucanase |
|  | Activity at 41.7 units per gram of total enzyme mix. |
|  | Activity at 50 units per milliliter of total enzyme mix. |

TABLE 4
TYPICAL ANALYSIS OF COLOURANT

| | |
|---|---|
| Solids | 80% |
| Protein (N × 5.7) | 5.1% |
| Fat | 0.8% |
| Carbohydrate | 72.41% |
| Ash | 1.75% |
| EBC Colour | 17830 EBC Units |
| 4 MeI | 16.9 ppm |
| Turbidity | No turbidity evident in the range pH 2.1–pH 7.0 |
| Acid Stability (Haze test) | No haze evident after 130 minutes |
| Absorbance | Peaks at 410 mu and 465 mu |

What we claim is:

1. A method for producing an edible colourant comprising the steps of:
   (A) digesting a roasted malted cereal in water by use of at least one enzyme selected from the group comprising proteases and at least one other enzyme selected from the group comprising carbohydrases; and
   (B) subsequently separating an aqueous extract from the remaining solids and retaining said extract whereby there is retained a colourant suitable for use in foodstuffs and beverages.

2. A method according to claim 1 further comprising the step of concentrating said retained extract.

3. A method according to claim 2 further comprising the step of drying said retained extract.

4. A method according to any one of claims 1 to 3 wherein at least one protease is papain.

5. A method according to any one of claims 1 to 3 wherein at least one carbohydrase is selected from the group comprising alpha-amylase, beta-glucanase, amylo-glucosidase and cellulase.

6. A method according to any one of claims 1 to 3 wherein said digestion is conducted by use of a mixture of enzymes comprising papain, alpha-amylase and beta-glucanase.

7. A method according to claim 6 wherein each enzyme of said mixture is present in an amount so that the minimum activity thereof is 10,000 units as herein defined.

8. A method according to claim 6 further comprising the steps of adjusting the digestion conditions to favour the activity of at least one protease, prior to adjusting the digestion conditions to favour the activity of at least one carbohydrase.

9. A method according to any one of claims 1 to 3 wherein said malted cereal is black-malted.

10. A method according to any one of claims 1 to 3 wherein said malted cereal is a malted barley.

11. A method according to any one of claims 1 to 3 wherein said malted cereal is a black-malted barley.

12. A method for producing an edible colourant comprising the steps of:
   (A) selecting a malted cereal;
   (B) roasting said selected malted cereal;
   (C) digesting this roasted malted cereal in water by use of at least one enzyme selected from the group comprising proteases and at least one other enzyme selected from the group comprising carbohydrases; and
   (D) subsequently separating an aqueous extract from the remaining solids and retaining said extract whereby there is retained a colourant suitable for use in foodstuffs and beverages.

13. A method according to claim 12 further comprising the step of concentrating said retained extract.

14. A method according to claim 12 further comprising the step of drying said retained extract.

15. A method according to any one of claims 12 to 14 wherein at least one protease is papain.

16. A method according to any one of claims 12 to 14 wherein at least one carbohydrase is selected from the group comprising alpha-amylase, beta-glucanase, amylo-glucosidase and cellulase.

17. A method according to any one of claims 12 to 14 wherein said digestion is conducted by use of a mixture of enzymes comprising papain, alpha-amylase and beta-glucanase.

18. A method according to claim 17 wherein each enzyme of said mixture is present in an amount so that the minimum activity thereof is 10,000 units as herein defined.

19. A method according to claim 17 further comprising the steps of adjusting the digestion conditions to favour the activity of at least one protease, prior to adjusting the digestion conditions to favour the activity of at least one carbohydrase.

20. A method according to any one of claims 12 to 14 wherein said malted cereal is black-malted.

21. A method according to any one of claims 12 to 14 wherein said malted cereal is a malted barley.

22. A method according to any one of claims 12 to 14 wherein said malted cereal is a black-malted barley.

23. A method according to any one of claims 12 to 14 further comprising the step of selecting a cereal and malting said cereal whereby to produce said malted cereal.

24. A colourant for use in foods or beverages comprising the water soluble product of enzymic digestion of a roasted malted cereal, separated from mash solids, and having a content of 4 methylimidazole of less than 100 mg/Kg.

25. A colourant according to claim 24 having a 4 methylimidazole content of less than 50 mg/Kg.

26. A colourant according to claim 24 or claim 25 having a solids content of greater than 80% by weight.

27. A colourant according to claim 26 when dried.

28. A colourant according to claim 27 when a free-flowing powder.

29. A colourant according to claim 25 having a colour of greater than 14,000 EBC units, European Brewery Convention Colour Scale, at 70% solids by weight.

30. A colourant according to claim 24 when the cereal is barley.

31. A colourant according to claim 24 when the cereal is a black-malted cereal.

32. A colourant according to claim 24 when the cereal is black-malted barley.

* * * * *